United States Patent [19]

Minoura et al.

[11] Patent Number: 5,100,222
[45] Date of Patent: Mar. 31, 1992

[54] SCREEN AND IMAGE DISPLAY APPARATUS

[75] Inventors: Nobuo Minoura, Yokohama; Katsumi Kurematsu, Kawasaki; Haruyuki Yanagi; Hideaki Mitsutake, both of Yokohama, all of Japan

[73] Assignee: Canon Kabushiki Kaisha, Tokyo, Japan

[21] Appl. No.: 559,371

[22] Filed: Jul. 27, 1990

Related U.S. Application Data

[63] Continuation of Ser. No. 439,813, Nov. 21, 1989, abandoned.

Foreign Application Priority Data

Nov. 22, 1985 [JP] Japan ................. 63-294885
Nov. 6, 1989 [JP] Japan ................. 1-288133

[51] Int. Cl.$^5$ .............................................. G03B 21/60
[52] U.S. Cl. ................................................... 359/455
[58] Field of Search .......................... 350/127–129, 350/122; 353/38, 81, 102, 74, 82, 78

[56] References Cited

U.S. PATENT DOCUMENTS

| | | | |
|---|---|---|---|
| 2,441,747 | 5/1948 | Beshgetoor | 76/107 |
| 2,510,344 | 6/1950 | Law | 88/28.93 |
| 3,848,980 | 11/1974 | Plummer | 352/81 |
| 3,972,593 | 8/1976 | Appledorn et al. | 350/211 |
| 3,982,822 | 9/1976 | Conder et al. | 350/211 |
| 4,076,384 | 2/1978 | Deml et al. | 350/122 |
| 4,147,408 | 4/1979 | Plummer | 350/128 |
| 4,374,609 | 2/1983 | Lange | 350/128 |
| 4,439,027 | 3/1984 | Shioda et al. | 350/128 X |
| 4,468,092 | 8/1984 | Inoue et al. | 350/128 |
| 4,482,206 | 11/1984 | Van Breemen | 350/128 |
| 4,509,822 | 4/1985 | Clausen et al. | 350/128 |
| 4,512,631 | 4/1985 | Van Breemen | 350/128 |
| 4,525,029 | 6/1985 | Inoue et al. | 350/128 |
| 4,550,977 | 11/1985 | Inoue et al. | 350/128 |
| 4,666,248 | 5/1987 | Van de Ven | 350/128 |
| 4,721,361 | 1/1988 | Van de Ven | 350/128 |
| 4,880,292 | 11/1989 | Kageyama et al. | 350/128 |
| 4,919,515 | 4/1990 | Hasegawa et al. | 350/128 |
| 4,919,518 | 4/1990 | Ogino et al. | 350/128 |
| 4,921,330 | 5/1990 | Takahashi et al. | 350/128 |
| 4,923,280 | 5/1990 | Clausen et al. | 350/128 |
| 4,936,652 | 6/1990 | Clausen et al. | 350/128 |
| 4,941,732 | 7/1990 | Umeda et al. | 350/128 |
| 4,961,642 | 10/1990 | Ogino | 353/38 X |

Primary Examiner—Richard A. Wintercorn
Attorney, Agent, or Firm—Fitzpatrick, Cella, Harper & Scinto

[57] ABSTRACT

A screen is disposed in the position at which an image is formed by an image projector. The screen comprises a transparent sheet having a longitudinal direction and a latitudinal direction, and a fresnel lens surface formed on one surface of the transparent sheet to condense a light beam entered thereinto and emit the condensed light beam, the focal length of the Fresnel lens surface in the longitudinal direction of said transparent sheet being shorter than that in the latitudinal direction of the sheet.

15 Claims, 5 Drawing Sheets

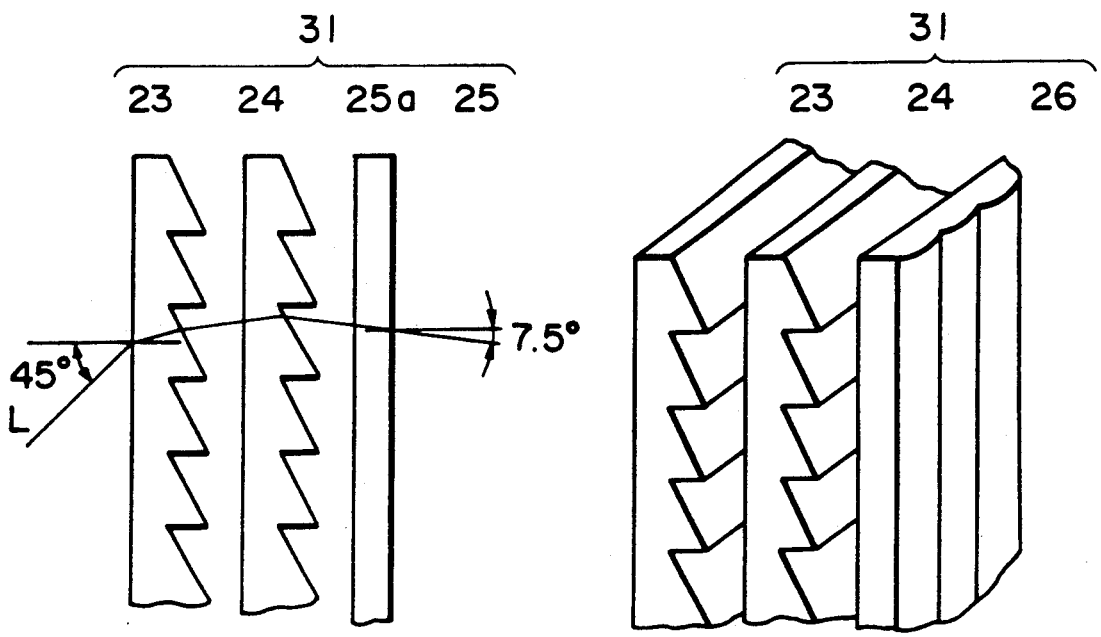
FIG. 9
FIG. 11
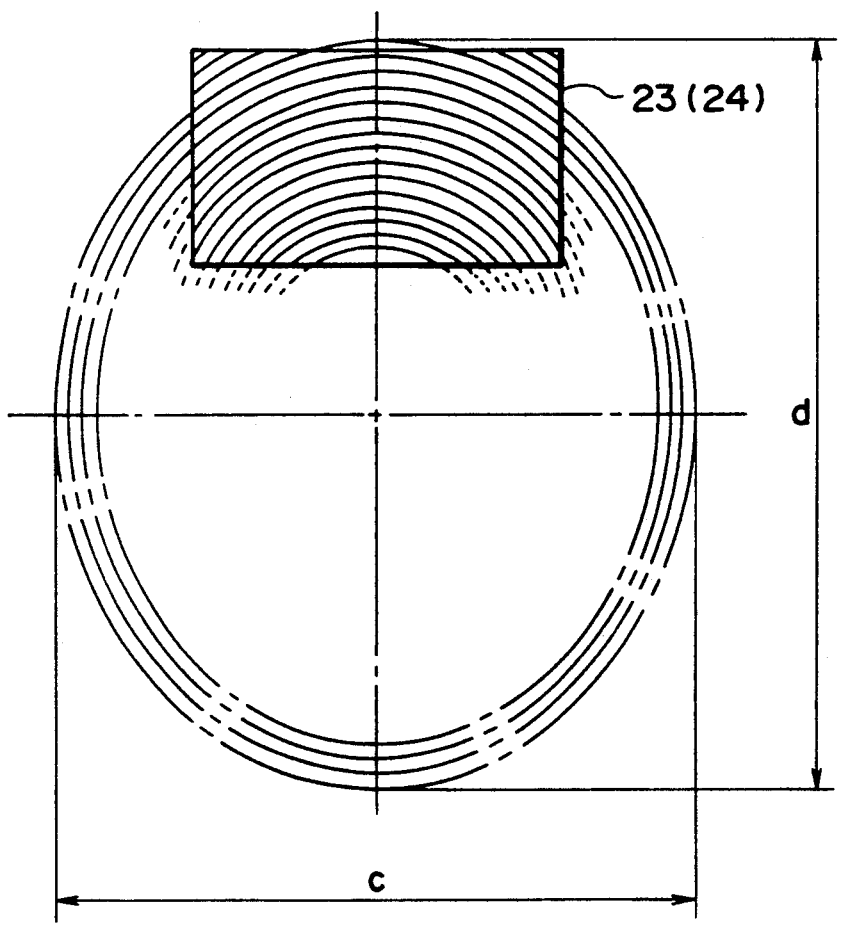
FIG. 10

SCREEN AND IMAGE DISPLAY APPARATUS

This application is a continuation of application Ser. No. 07/439,813 filed Nov. 21, 1989, now abandoned.

BACKGROUND OF THE INVENTION

1. Field of the Invention

The present invention relates to a back projection type screen having a large aspect ratio and capable of displaying an image with improved uniformity of brightness. The present invention relates also to a back projection type image display apparatus using the screen.

2. Related Background Art

A back projection type image display apparatus is known in the art. FIG. 1 illustrates a typical example of the back projection display apparatus according to the prior art. In order to show the essential components thereof, the cabinet and other auxiliary parts are all omitted in FIG. 1.

The display apparatus shown in FIG. 1 comprises a display device 1, a projection lens 2, a Fresnel lens sheet 8 and a lenticular lens sheet 9. The display device 1 may be, for example, a cathode ray tube (CRT). The Fresnel lens sheet 8 has a Fresnel lens formed on it serving as a condenser lens. The lenticular lens sheet 9 is provided for the control of the angle of field. If desired, a diffusing agent may be incorporated into the lenticular lens sheet. Also, a diffusing plate may be provided in stead of or in addition to the lenticular lens sheet 9. The Fresnel lens 8 is of the concentric form which is generally used at present. In the display apparatus shown in FIG. 1, an enlarged image light from the projection lens 2 is incident on the Fresnel lens sheet 8 perpendicularly (at the center of the sheet). But, there is known and used another type of display apparatus in which the enlarged image light from the projection lens obliquely enters onto a screen as shown in FIG. 2.

Referring to FIG. 2, an enlarged image light from the projection lens 2 is reflected by mirrors 3 and 4 and then incident on a screen 10. The angle of incident is $\theta_o$. Reference numeral 5 denotes a cabinet.

The first-mentioned apparatus as shown in FIG. 1 is referred to as a perpendicular incidence type of display in which $\theta_o = 0$. The second-mentioned one is referred to as an oblique incidence type of display. As readily seen in FIG. 2, the arrangement of the oblique incidence type has a particular advantage in practice that the depth l of the cabinet 5 can be reduced to a great extent as compared with that of the perpendicular incidence type. However, it involves some problems. Firstly, since the image light toward the viewer from the screen 10 is deviated down from the horizontal direction by an angle $\theta_o$, the picture plane appears somewhat dark for the viewer. Secondly, since the angle of incidence $\theta_o$ at the lower portion of the screen becomes large, an amount of reflection loss is caused at the surface of the Fresnel lens constituting the screen. Also, there occurs eclipse of light beam. As a solution to these problems, it has already been proposed to dispose plural eccentric Fresnel lenses on the inner side (on the image light incidence side) of the screen 10 so as to refract the image light in the horizontal direction, and also known to use a power-dispersed eccentric Fresnel lens which is able to moderately and gradually refract and deflect even such image light having a large incident angle.

However, in the prior art display screen, a concentric Fresnel lens as shown above is used for both of the perpendicular incidence type and the oblique incidence type, which necessarily leads to the problem of deterioration of brightness on the screen. The problem is enhanced in the case of high definition television (HDTV) whose screen is longer in horizontal and has a larger aspect ratio than that of the conventional NTSC system of image display apparatus. On the screen of HDTV, the brightness of image light decreases remarkably at the marginal areas along the left and right sides of the screen. In the case of conventional NTSC system in which an aspect ratio of 3:4 is used, the ratio of the brightness at the upper and lower marginal area and the brightness at the left and right marginal area (which is referred to as brightness difference) is not so large as to bring about a trouble. In contrast, the aspect ratio of the modern HDTV system is 9:16 and the brightness difference is 1.8 folds ($\sim 16/9$) which is far larger than 1.3 folds ($f 4/3$) of the conventional system. Such a large brightness difference is no longer negligible.

Referring to FIG. 3, an image of the CRT 1 is formed on the screen 10 through the projection lens 2.

It is most desirable that the brightness of the image is uniform over the screen 10. However, in practice, the brightness decreases down with the distance away from the optical axis 0. More specifically, the brightness of off-axial image decreases in proportion to the fourth power of the cosine of $\omega$ (rule of 4th power of cosine), wherein $\omega$ is the inclination angle of the principal ray incident upon the optical system relative to the optical axis. This decrease in brightness occurs even when the area of the entrance pupil of the projection lens 2 is kept constant.

For an oblong screen, therefore, the inclination angle $\omega$ becomes larger at the marginal area along the left and right sides of the screen. Consequently, according to the rule of 4th power of cosine, the brightness at the marginal area along the left and right sides is lower than the brightness at the marginal area along the upper and lower sides of the screen.

Thus, when a horizontally long and large screen is used, there is inevitably the problem of a decrease of brightness at the area along the left and right sides of the screen regardless of whether it is the perpendicular incidence type or the oblique incidence type.

SUMMARY OF THE INVENTION

Accordingly, an object of the present invention is to provide a back projection type screen in which the decrease of brightness at the long side marginal portion of the oblong screen is moderated, and the back projection type image display apparatus using the screen.

Other objects and features will appear more fully from the following description.

BRIEF DESCRIPTION OF THE DRAWINGS

FIG. 9 is a schematic view illustrating the construction of the screen;

FIG. 10 is a schematic view illustrating the eccentric elliplic Fresnel lens sheet shown in FIG. 9; and FIG. 11 shows a modification of the screen.

DESCRIPTION OF THE PREFERRED EMBODIMENTS

In order to attain the above objects, as shown in the following preferred embodiments of the screen and the image display apparatus using the same as according to the invention there is used an elliptic like Fresnel lens sheet.

Owing to this feature of the present invention, the condensing powers (focal lengths) in the directions along the long side and along the short side of the oblong screen is so changed that the irregularity of brightness at the viewing point can be moderated.

Preferred embodiments of the present invention will be described with reference to the accompanying drawings.

Figure 1:
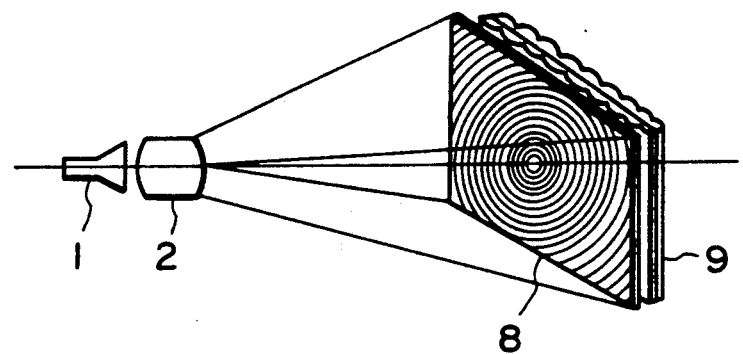
FIG. 1 is a view illustrating the construction of the perpendicular incidence type display according to the prior art.
Figure 2:
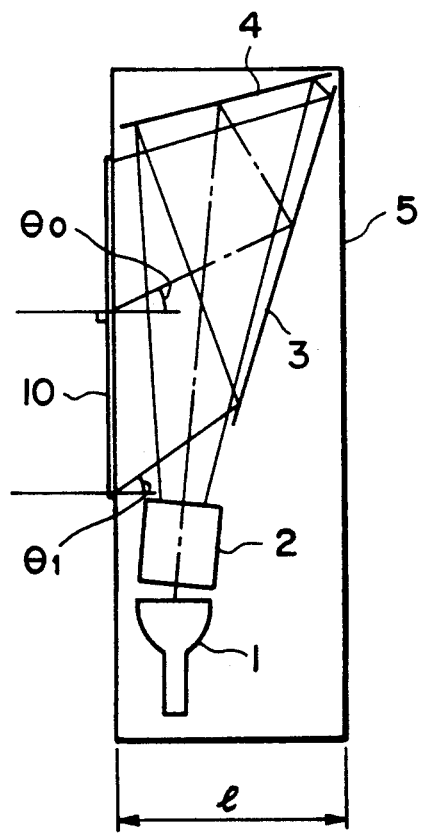
FIG. 2 is a view illustrating the construction of the oblique incidence type display according to the prior art.
Figure 3:
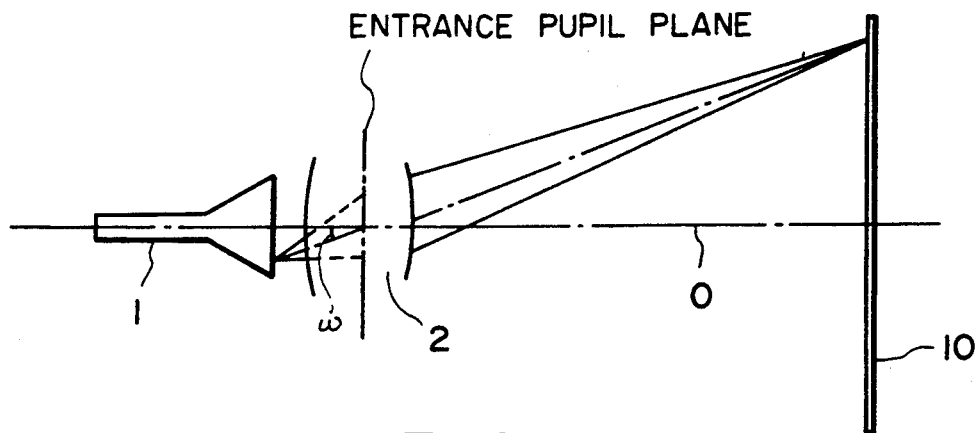
FIG. 3 is a view illustrating how uneven brightness occurs on a screen.
Figure 4:
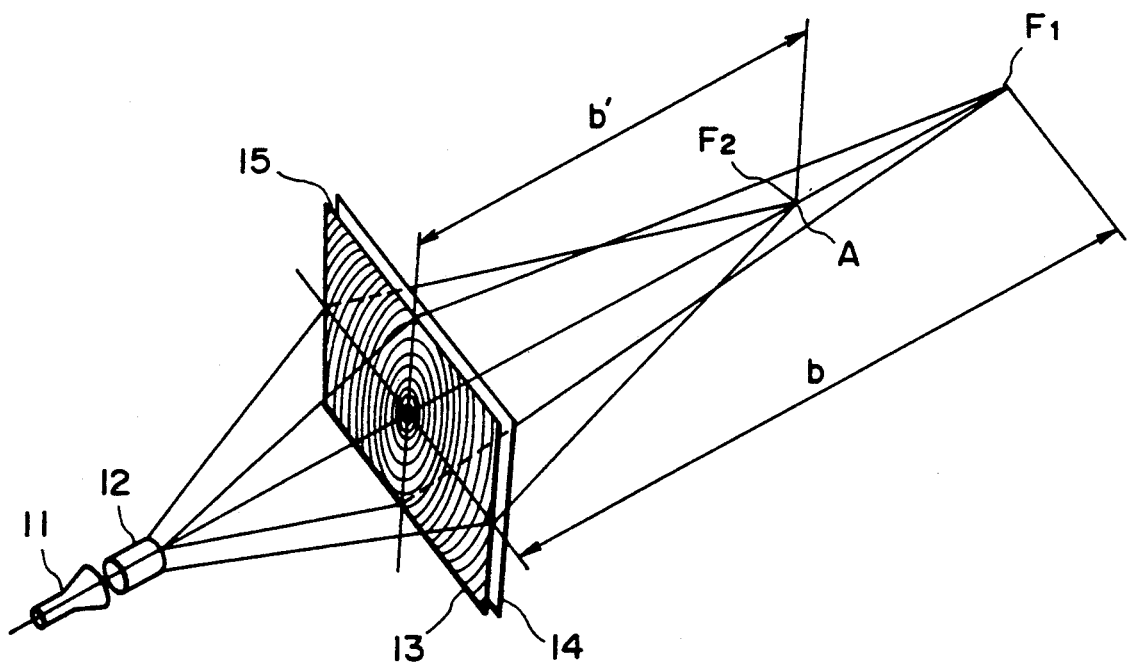
FIG. 4 is a schematic perspective view showing an embodiment of the perpendicular incidence type display according to the present invention.

FIG. 4 shows an embodiment of the present invention in which an elliptic Fresnel lens according to the invention is applied to a perpendicular incidence type of image display apparatus.

The display unit comprises a CRT 11, a projection lens 12, an elliptic Fresnel lens sheet 13 and a sheet having a function for diffusion such as a diffusing plate or a lenticular lens sheet 14.

Figure 5:
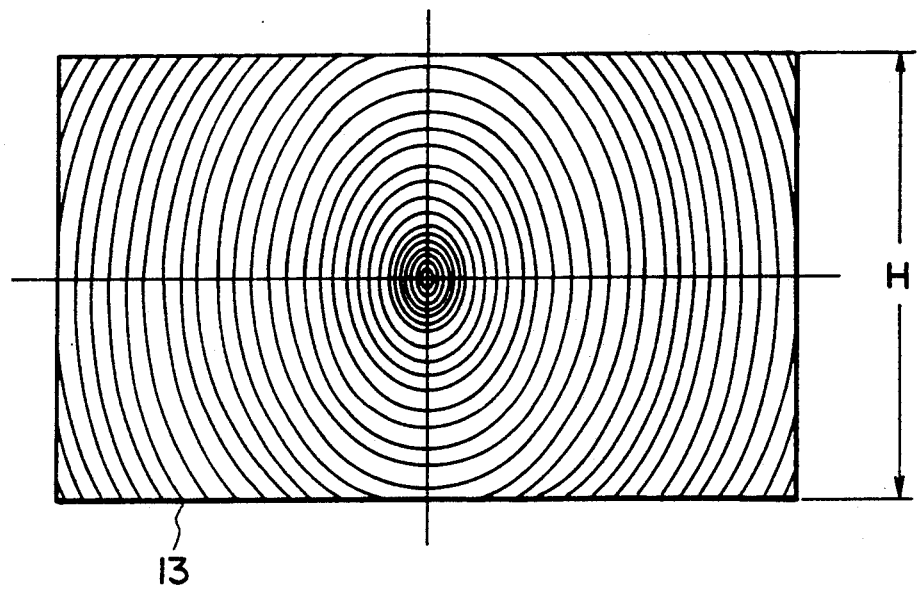
FIG. 5 is a front view of the elliptic Fresnel lens sheet shown in FIG. 4.

FIG. 5 is a front view of the elliptic Fresnel lens sheet 13. The center of a group of ellipses lies at the center of the sheet 13. All of the major axes of the ellipses align with a line extending parallel with the short side of the sheet 13 (the direction indicated by H).

Of the image light projected from the projection lens 12, rays passing through the center of the pupil of the projection lens, that is, the principal rays of the image light are focused two different focal points $F_1$ and $F_2$ in vertical and horizontal directions respectively. This is because the elliptic Fresnel lens sheet has two different focal lengths, namely vertical focal length $f_1$ and horizontal focal length $f_2$ ($f_1 > f_2$). In other words, a large portion of rays refracted by the upper and lower portions of the lens is focused at and near the focal point $F_1$ and a large portion of rays refracted by the left and right portions of the lens is focused at and near the focal point $F_2$. Therefore, assuming that a viewer at or about the view point A is viewing the screen 15, it is possible to substantially uniformalize the brightness in the marginal areas along the long and short sides of the oblong screen 15 by suitably selecting the value of k for $f_1 = kf_2$. The value of k is determined depending on various factors such as the condition of the image light to be projected on the screen 15 from the projection lens 12, the aspect ratio of the screen 15 and the distance between the screen 15 and the view point A. Generally speaking, for HDTV, it is expected that the distance from the viewer to the screen 15 is about three times longer than the height H of the screen 15. Therefore, it is advisable to determine the value of k in the manner as to satisfy the conditions $$b' \simeq 3H \sim 6H, b \simeq 6H \sim 8H (b' < b)$$

wherein b is the distance between screen 15 and focal point $F_1$ and b' is the distance between screen 15 and focal point $F_2$. When the selection is made in this manner, the distribution of brightness over the screen can be uniformalized to some extent for the following reason. That is as for the rays emerging from both edges in the longitudinal direction of the screen, a light intensity distribution by light angle is obtained. There exists an angle at which the center of the light intensity distribution is present. If there is obtained an approximate coincidence between said angle and the direction in which the viewer is present, then the intensity of the light directed to the viewer from both edge portions can be increased. As the result, the irregularity of the brightness distribution over the screen can be moderated regarding the viewer. More concretely, the irregularity of brightness can be moderated by increasing the intensity of the light coming from both longitudinal edge portions, which can be attained by making the distance b' substantially equal to the distance between the screen 15 and the viewer; or setting the view point before the longitudinal focal point.

Figure 6:
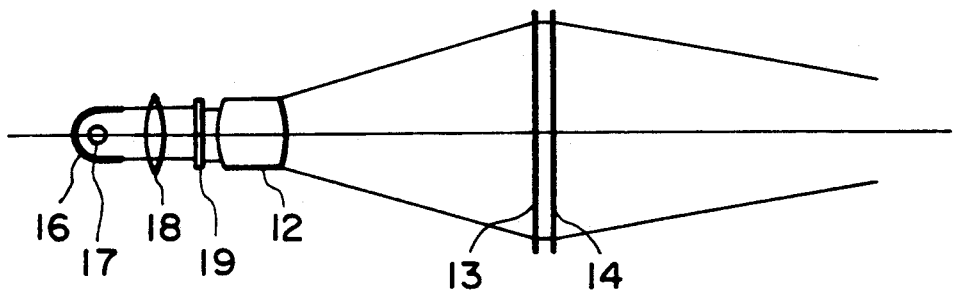
FIG. 6 illustrates a modification thereof.

FIG. 6 shows a modification of the above embodiment.

In this modification, the CRT 11 is replaced by a system composed of a parobolic surface (concave surface) reflection mirror 16, a light source 17, a condenser lens 18 and a liquid crystal display 19. The light emitted from the light source 17 is reflected by the reflection mirror 16 and enters the condenser lens 18. After condensed by the condenser lens, the light projects an image on the liquid crystal display 19 onto a projection lens 12. Other parts of this modification correspond to those of the first embodiment shown in FIGS. 4 and 5.

Figure 7:
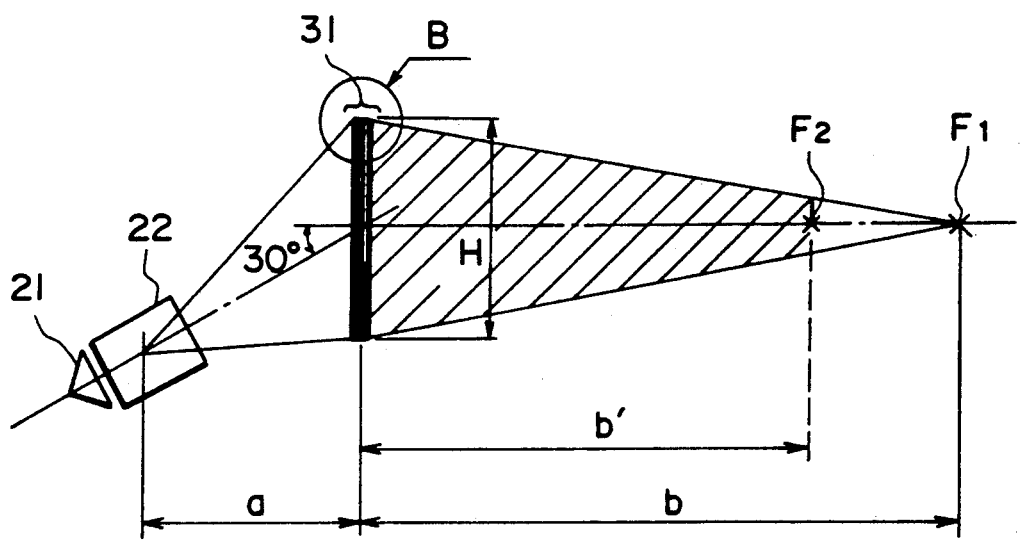
FIG. 7 is a schematic side view showing an embodiment of the oblique incidence type display according to the present invention.
Figure 8:
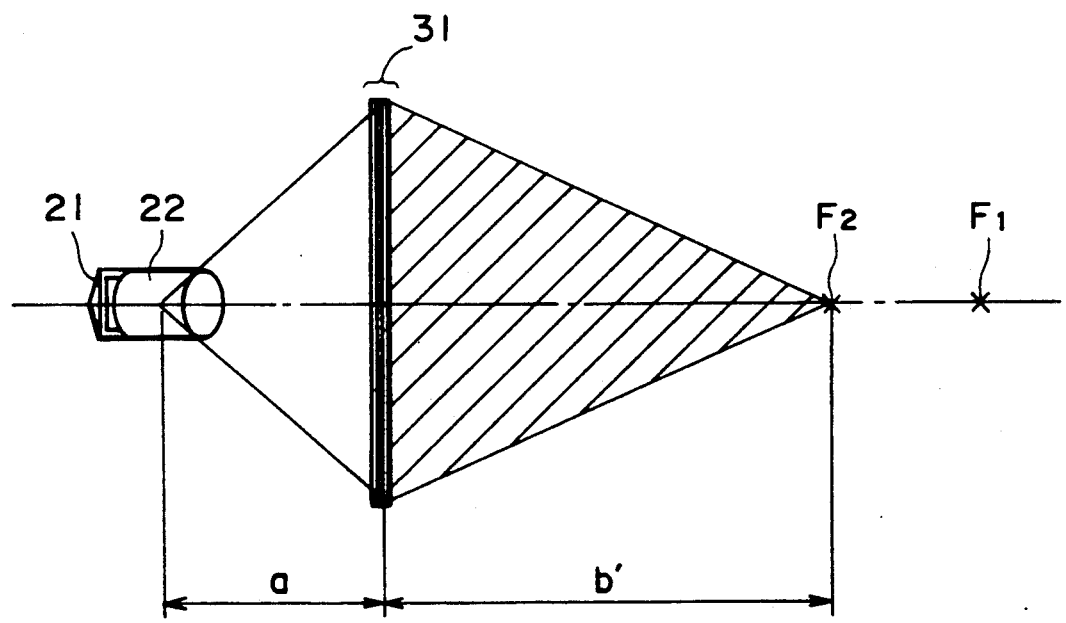
FIG. 8 is a schematic plan view thereof.

FIGS. 7 and 8 show an embodiment of the oblique incidence type of display apparatus according to the present invention. FIG. 7 is a side view thereof and FIG. 8 is a plan view thereof. Designated by 21 is a CRT, 22 is a projection lens and 31 is a screen which comprises an eccentric elliptic Fresnel lens, the projection lens 22 is disposed such that its optical axis is inclined with 30° relative to the horizontal direction.

FIG. 9 is a schematic view of a portion B of the screen 31 shown in FIG. 7. L denotes a light path of a light incident on this portion of the screen. The screen 31 comprises two transmissive sheets 23, 24 having each an elliptic Fresnel lens, and a difusing plate 25 having a diffusing layer 25a. These members are made of, for example, methacrylic resin having a refractive index of about 1.5. The sheets 23 and 24 have the same structure having a plain surface on the light entrance side and a group of fine prisms formed on the light exit side. The fine prisms have a predetermined inclined shape having an inclination angle and arranged in concentric ellipses. The center of the ellipses is eccentric to the center of the sheet 23 (24) as seen best from FIG. 10.

As shown in FIG. 10, the ellipses are concentric and the ratio of major axis and minor axis is d : c (d>c). The direction of the major axis d is parallel to the short sides of the oblong sheet 23 (24).

The sheets 23 and 24 have, therefore, a larger lens power in horizontal direction than in vertical direction.

Let a, b, b' and H denote the lengths as previously shown in FIGS. 7 and 8. Then, the focal lengths $f_1$ and $f_2$ regarding the vertical and horizontal directions of the screen 31 can be determined according to the following equations:

$$1/f_1 = 1/a - 1/b = 1/a - 1/8H,$$

$$1/f_1 = 1/a - 1/b' = 1/a - 1/6H.$$

Thus, as seen in FIG. 7, the principal rays of the light beam vertically entering the screen 31 are mostly focused at or near the focal point $F_1$, which is $8 \times H$ distant from the screen 31 (H is the height of the screen). Similarly, as seen in FIG. 8, the principal rays of the light beam horizontally entering the screen 31 are mostly focused at or near the focal point $F_2$, which is $6 = H$ distant from the screen 31.

In this manner, the lens power is increased in horizontal direction as compared with the power is vertical direction so that the reduction of brightness in horizontal direction can be moderated. Consequently, there is obtained good image with improved uniformity of brightness, omitting unevenness thereof.

The merit obtained by providing two eccentric Fresnel lens surfaces is found, as shown in FIG. 9, in that even a beam entering the marginal portion of the screen with a large angle of incidence (for example, 45°) can be moderately and gradually deflected toward the focal point $F_1$ (see FIG. 7) and that the exit beam from the marginal portion can run in the direction substantially normal to the lens surface. In the embodiment shown in FIG. 9, an exit angle of about 7.5 is attainable for such marginal beam. The problem involved in the oblique incidence type display as previously mentioned can be solved by this embodiment of the present invention.

FIG. 11 shows a modification of the screen shown in FIG. 9. In this modification, the diffusing plate 25 is replaced by a lenticular lens sheet 26 for the purpose of the control of the angle of field.

The setting of b and b' (b>b') shown in the above embodiment is never limited. b=H and b'=4H also may be used. When this is selected, a larger amount of light beam can be focused and, therefore, the viewer can enjoy the screen image with higher brightness.

As readily understood from the foregoing, the present invention moderates the brightness reduction in both marginal areas of the oblong screen, in particular, in the longitudinal marginal area. Therefore, according to the present invention, a screen cable of displaying images without irregularity of brightness over the screen can be realized.

We claim:

1. A screen to be disposed in the position at which an image is formed by image projection means, said screen comprising:
   a transparent sheet having a first longitudinal direction and a latitudinal direction; and
   a Fresnel lens surface formed on said first transparent sheet to condense a light beam entered thereinto and emit the condensed light beam, the focal length of said Fresnel lens surface in the longitudinal direction of said first transparent sheet being shorter than that in the latitudinal direction of said first transparent sheet.

2. A screen according to claim 1, wherein said Fresnel lens surface comprises a plural number of concentrical elliptic prisms with the center of the ellipses being eccentric to the center of said first transparent sheet.

3. A screen according to claim 3, further comprising a second transparent sheet opposed to said first transparent sheet, said second transparent sheet having a Fresnel lens surface formed thereon to condense a light beam entered thereinto and emit the condensed light beam, the longitudinal focal length of said Fresnel lens surface being shorter than the latitudinal focal length.

4. An image display apparatus comprising:
   image projection means for projecting an image to be displayed; and
   a screen disposed in the position at which said image projection means forms an image, said screen comprising a first transparent sheet having a longitudinal direction and a latitudinal direction, and a Fresnel lens surface formed on said first transparent sheet to condense a light beam entered thereinto and emit the condensed light beam, the focal length of said Fresnel lens surface in the longitudinal direction of said first transparent sheet being shorter than that in the latitudinal direction of said first transparent sheet.

5. An image display apparatus according to claim 4, wherein said fresnel lens surface comprises a plural number of concentrical elliptic prisms with the center of the ellipses being eccentric to the center of said first transparent sheet.

6. An image display unit according to claim 5, wherein said image projection means projects a light beam obliquely into said first transparent sheet and said Fresnel lens surface emits a principal ray of the entered light beam while deflecting the ray in the direction substantially normal to said first transparent sheet.

7. An image display unit according to claim 6, further comprising a second transparent sheet opposed to said first transparent sheet, said second transparent sheet having a Fresnel lens surface formed thereon to condense a light beam entered thereinto and emit the condensed light beam, the longitudinal focal length of said Fresnel lens surface being shorter than the latitudinal focal length.

8. A screen to be disposed in a position at which an image is projected by an image projector for viewing by a viewer, said screen comprising:
   a screen having a longitudinal direction and a latitudal direction; and
   a Fresnel lens, formed on the sheet, for condensing a light beam from the image projector, with a focal length of said Fresnel lens in the longitudinal direction of said sheet being shorter than a focal length of said Fresnel lens in the latitudinal direction of said sheet.

9. An image display apparatus for displaying a predetermined image to a viewer, comprising:
   a projector for projecting the image; and
   a screen on which the image is projected, said screen including a sheet having a longitudinal direction and a latitudinal direction, with a Fresnel lens formed on said sheet and having a focal length in the longitudinal direction different from a focal length in the latitudinal direction, and wherein each of the focal lengths of said Fresnel lens is determined so that a first focused position, determined by said screen, of light from said projector in the longitudinal direction is closer to the viewer than a second focal position, determined by said screen, of the light in the latitudinal direction.

10. An apparatus according to claim 9, wherein the focal length of said Fresnel lens in the longitudinal direction is shorter than the focal length of said Fresnel lens in the latitudinal direction.

11. An apparatus according to claim 9, wherein said sheet is a transparent sheet.

12. An apparatus according to claim 10, wherein said sheet is a transparent sheet.

13. An apparatus according to claim 8, wherein the first position is set in the vicinity of the viewer.

14. An apparatus according to claim 9, wherein the first position is set in the vicinity of the viewer.

15. An apparatus according to claim 10, wherein the first position is set in the vicinity of the viewer.

* * * * *

UNITED STATES PATENT AND TRADEMARK OFFICE
CERTIFICATE OF CORRECTION

PATENT NO. : 5,100,222

DATED : March 31, 1992

INVENTOR(S) : Nobuo Minoura, et al.

It is certified that error appears in the above-identified patent and that said Letters Patent is hereby corrected as shown below:

TITLE PAGE:

[30] FOREIGN APPLICATION PRIORITY DATA:

"Nov. 22, 1985 [JP] Japan....... 63-294885" should read
--Nov. 22, 1988 [JP] Japan ........ 63-294885--.

[56] REFERENCES CITED:

Insert --U.S. PATENT DOCUMENTS
```
4,725,134   2/1988   Ogino ......................353/74
4,708,435  11/1987   Yata, et al. ..............350/129
4,701,020  10/1987   Bradley, et al. ...........350/128
4,674,836   6/1987   Yata, et al. ..............350/128
4,458,993   7/1984   Kempf .......................353/82
4,391,495   7/1983   Mazurkewitz ................350/452
4,173,399  11/1979   Yevick .......................353/78
4,152,047   5/1979   Inoue ......................350/122
```

FOREIGN PATENT DOCUMENTS
```
  692569   6/1953   U.K.
 1487841   5/1967   France
60-61738   4/1985   Japan--.
```

COLUMN 1:

Line 42, "incident" (second occurrence) should read
--incidence--.

COLUMN 2:

Line 7, "horizontal" should read --the horizontal direction--.

UNITED STATES PATENT AND TRADEMARK OFFICE
CERTIFICATE OF CORRECTION

PATENT NO. : 5,100,222
DATED : March 31, 1992
INVENTOR(S) : Nobuo Minoura, et al.

It is certified that error appears in the above-identified patent and that said Letters Patent is hereby corrected as shown below:

Line 20, "folds (∫4/3)" should read --folds (~4/3)--.

COLUMN 3:

Line 11, "elliplic" should read --elliptic--.
   Line 45, "focused" should read --focused at--.
   Line 56, "uniformalize" should read --uniformize--.

COLUMN 4:

Line 8, "uniformalized" should read --uniformized--.

COLUMN 5:

Line 6, $1/f_1 = 1/a - 1/b' = 1/a - 1/6H.$" should read --$1/f_2 = 1/a - 1/b' = 1/a - 1/6H.$--.
   Line 15, "6 = H distant" should read --6 x distant--.
   Line 30, "7.5" should read --7.5°--.
   Line 47, "cable" should read --capable--.
   Line 54, "transparent sheet" should read --first transparent sheet-- and "first" should be deleted.
   Line 67, "claim 3," should read --claim 1,--.

COLUMN 6:

Line 43, "screen" should read --sheet--.
   Line 44, "dal" should read --dinal--.
   Line 62, "first focused position, deter-" should read --first position, focused--.

UNITED STATES PATENT AND TRADEMARK OFFICE
CERTIFICATE OF CORRECTION

PATENT NO. : 5,100,222

DATED : March 31, 1992

INVENTOR(S) : Nobuo Minoura, et al.

It is certified that error appears in the above-identified patent and that said Letters Patent is hereby corrected as shown below:

Line 63, "mined" should be deleted--.
Line 65, "second focal position, determined" should read --second position, focused--.

Signed and Sealed this

Seventh Day of September, 1993

Attest:

BRUCE LEHMAN

Attesting Officer

Commissioner of Patents and Trademarks